United States Patent [19]

Zhang et al.

[11] Patent Number: 6,080,698

[45] Date of Patent: Jun. 27, 2000

[54] PENTASIL-TYPE MOLECULAR SIEVE CONTAINING COMPOSITION AND ITS PREPARATION METHOD

[75] Inventors: Fengmei Zhang; Xingtian Shu; Zhicheng Shi; Weidong Wang; Fengming Qin; Xieqing Wang, all of Beijing, China

[73] Assignees: China Petrochemical Corporation; Research Institute of Petroleum Processing, both of Beijing, Japan

[21] Appl. No.: 09/154,581

[22] Filed: Sep. 17, 1998

[30] Foreign Application Priority Data

Sep. 17, 1997 [CN] China .................................. 97116435
Sep. 17, 1997 [CN] China .................................. 97116445

[51] Int. Cl.[7] .................................................. B01J 29/40
[52] U.S. Cl. ............................... 502/74; 502/64; 502/66; 502/71; 502/77
[58] Field of Search ................................ 502/64, 66, 71, 502/74, 77

[56] References Cited

U.S. PATENT DOCUMENTS

| 4,137,195 | 1/1979 | Chu | 502/85 |
| 4,548,914 | 10/1985 | Chu | 502/85 |
| 4,581,215 | 4/1986 | Kaeding | 423/328 |

FOREIGN PATENT DOCUMENTS

| 85100463 | 2/1986 | China . |
| 1058382 | 2/1992 | China . |
| 1083092 | 3/1994 | China . |
| 0030811 | 6/1981 | European Pat. Off. . |
| 0040463 | 11/1981 | European Pat. Off. . |
| 0068755 | 1/1983 | European Pat. Off. . |
| 111748 | 11/1983 | European Pat. Off. . |
| 0393667 | 10/1990 | European Pat. Off. . |
| 1334243 | 10/1973 | United Kingdom . |

OTHER PUBLICATIONS

XP002088540, Database WPI, Section Ch, Week 9427, Class E17, AN 94–221804 (1994).
XP002088526, Database WPI. Section Ch, Week 8943, Class A41, AN 89–312268 (1989).
XP–002088525, Database Compendex Engineering Information, Inc. Chen Lianzhang et al.: "Modified ZSM Catalysts for Increasing P–Xylene Selectivity in Toluene Disporportionation Reaction," New York, NY (Jun. 1987).
Abstract of JP 60 77,123 (JP 85 77,123) 1985.
Abstract of JP 60 71,519 (85 71,519) 1985.

*Primary Examiner*—Tom Dunn

[57] ABSTRACT

A molecular sieve containing composition, which can be applied in catalytic cracking reaction for producing more ethylene and propylene, and its preparation method. The composition contains a pentasil-type molecular sieve having a $SiO_2/Al_2O_3$ molar ratio of 15–60, prepared by activation and modification with phosphorus, alkaline earth metal and transition metal. The composition essentially includes 85~98% wt of pentasil-type molecular sieve, 1~10% wt of $P_2O_5$, 0.3~5% wt of alkaline earth oxide, and 0.3~5% wt of transition metal oxide. The molecular sieve structure and active centers have high thermal and hydrothermal stability. The salient feature of this composition is that when applied as an active component of cracking catalyst for catalytic pyrolysis process, the yield of ethylene is above 18% and the total yield of ethylene and propylene is more than 40%.

23 Claims, No Drawings

PENTASIL-TYPE MOLECULAR SIEVE CONTAINING COMPOSITION AND ITS PREPARATION METHOD

BACKGROUND OF THE INVENTION/FIELD OF THE INVENTION

This invention relates to a pentasil-type molecular sieve containing composition which can be applied in catalytic cracking reaction for producing more ethylene and propylene, and its preparation method.

DESCRIPTION OF THE BACKGROUND ART

The pentasil-type molecular sieves invented by Mobil Corporation, such as ZSM-5 (U.S. Pat. No. 3,702,886, 1976), ZSM-8 (GB1334243A), ZSM-11 (U.S. Pat. No. 3,709,979, 1973) and ZSM-5/ZSM-11 (U.S. Pat. No. 4,289,607, 1981), after modification, are widely used in hydrocarbon conversion reactions such as aromatic hydrocarbon alkylation, disproportionation, isomerization, catalytic cracking, catalytic dewaxing and synthesis of gasoline from methanol etc., in which ZSM-5 is most successfully used.

ZSM-5 molecular sieves was synthesized formerly by using organic amines as templates, including tetrapropylammonium, tetraethylammonium, hexamethylenediamine, ethylenediamine, n-butylamine and ethylamine etc. Because of the expensive cost and environmental contamination, the method of synthesizing ZSM-5 without using organic substances has been widely explored at the same time. For example, in EP111748A (1984), ZSM-5 zeolite is synthesized by using water glass, aluminum phosphate and phosphoric acid; in CN85100463A, ZSM-5 zeolite is synthesized by using water glass, inorganic aluminum salts and mineral acid as initial materials; in CN1058382A, rare-earth containing ZSM-5 zeolite is synthesized by using water glass, aluminum phosphate and mineral acids as source materials and REY or REHY as crystal seeds. JP8571519 and JP8577123 reported a method in which ZSM-5 molecular sieve is synthesized by adding ZSM-5 as crystal seeds under the condition that no amine is used.

In order to satisfy the different kinds of requirements in different reactions, a lot of methods of modifying ZSM-5 molecular sieve and their different effects are reported. For example, methods for modifying ZSM-5 molecular sieve using a phosphorus-containing compound are reported in U.S. Pat. No. 3,972,382 and U.S. Pat. No. 3,965,208, in which HZSM-5 with a $SiO_2/Al_2O_3$ ratio of 70 is reacted with trimethyl phosphite to prepare a phosphorus containing molecular sieve. This preparation method has several disadvantages of complicated conditions as well as high costs, and the samples obtained have lower reactivity than the samples not containing phosphorus, but have an advantage of high selectivity.

U.S. Pat. No. 4,365,104, U.S. Pat. No. 4,137,195, U.S. Pat. No. 4,128,592 and U.S. Pat. No. 4,086,287 report a method of modifying ZSM-5 molecular sieve using P and Mg for the purpose of improving the para-xylene selectivity by using the modified molecular sieve in xylene isomerization, toluene alkylation with methanol and toluene disproportionation reactions. The introduction of P and Mg is for increasing the molecular sieve's shape selectivity. On the other hand, the molecular sieve's acidity and reactivity in hydrocarbon conversion reaction are decreased by the modification. In these patents, P and Mg are impregnated in two steps separately. That is the molecular sieve or molecular sieve containing catalyst is firstly impregnated with $NH_4H_2PO_4$ or $(NH_4)_2HPO_4$ aqueous solution, and then filtered, dried, and calcined; and secondly impregnated with $Mg(NO_3)_2$ or $Mg(CH_3COO)_2$ aqueous solution, then filtered, dried and calcined, then the P and Mg modified molecular sieve or catalyst containing the molecular sieve is obtained. In this method, the content of P and Mg has an uncertainty, since it depends on reaction condition of temperature, time and calcination. At the same time, the Mg can not be well dispersed.

In U.S. Pat. No. 4,260,843, a method of modifying ZSM-5 molecular sieve with P and Be for increasing the shape selectivity is reported. U.S. Pat. No. 4,288,647 has described a method of modifying ZSM-5 molecular sieves with Ca, Sr, Ba and P for improving the shape selectivity. In these patents, the method for modifying the molecular sieve is basically the same as the above-mentioned method with P and Mg, but the activity of the modified molecular sieve is even further lowered.

In above patents, the precursor of the molecular sieve is described with a $SiO_2/Al_2O_3$ ratio higher than 12, generally higher than 30 (U.S. Pat. No. 3,972,832). The content of modification P element is generally higher than 0.25% wt, the content of alkaline earth element is required to be higher than 0.25% wt, and in the range of 0.25~25% wt. In the examples of the embodiments, the content of alkaline-earth element (Mg, Ca etc.) is generally higher than the content of the P element. The object of the above patents is mainly to increase the shape selectivity of the molecular sieves, which are all used in isomerization and disproportionation reactions for booming the selectivity to xylene. Generally, it is acknowledged that after alkaline earth modification, the molecular sieve's acidity is decreased, and its catalytic activity in hydrocarbon conversion is decreased too.

Catalytic pyrolysis process for producing ethylene is a new way to increase ethylene production. Conventional steam cracking method for producing ethylene has the disadvantages of high cracking temperature and strict requirement for the quality of the feedstock. People hold that the production of ethylene by steam cracking method is carried out through the mechanism of free radical reaction, so it requires high reaction temperature. The present invention sets forth a series of processes and catalysts in catalytic cracking for producing lower carbon olefins in the patents such as U.S. Pat. No. 4,980,053, U.S. Pat. No. 5,326,465, U.S. Pat. No. 5,358,918, U.S. Pat. No. 5,380,690, U.S. Pat. No. 5,670,037, etc. In all these patents, cracking catalysts generally contain higher silica pentasil-type zeolites having P and rare-earth elements, and are all for increasing $C_3^=$~$C_5^=$ olefins production, with relatively lower ethylene yield. Under the condition of catalytic cracking with catalyst containing ZSM-5 molecular sieve, the $C_3^=$~$C_5^=$ olefins are remarkably increased because of the medium sized pore system and higher shape selective capability, however, the reaction is still through carbonium ion mechanism. In CN1083092A, a catalytic pyrolysis process for producing ethylene and propylene is reported by using cross-linked pillared clay-containing molecular sieve or rare-earth containing pentasil-type molecular sieve as catalyst at a temperature range of 680~780° C. in which ethylene can remarkably be increased. The catalyst does not contain metallic component.

Considering that producing more ethylene needs higher reaction and regeneration temperatures, it requires that the molecular sieve active components must have better thermal and hydrothermal stability with respect to both the structure and active center, that is under the severe hydrothermal treatment condition, the molecular sieve must maintain its high activity. In addition, it is needed to increase the formation of carbonium ion and its direct cracking, especially increasing the formation of primary carbonium ion and its direct cracking, at the same time, depressing the isomerization of primary carbonium ion to secondary or tertiary carbonium ion. Therefore, the shape selective cracking capability of the molecular sieve is required to be strengthened, while desirably it should have certain dehydrogenation capability for increasing olefin yield.

SUMMARY AND OBJECTS OF THE INVENTION

The object of this invention is to provide a pentasil-type molecular sieve containing composition which can be applied in catalytic cracking reaction for producing more ethylene and propylene, and which has better thermal and hydrothermal stability, and can increase the ethylene yield further when being used in catalytic pyrolysis process, in comparison with the catalytic materials of the prior art.

Another object of this invention is to provide a method for preparing said pentasil-type molecular sieve containing composition.

DETAILED DESCRIPTION OF THE PREFERRED EMBODIMENTS

The pentasil-type molecular sieve containing composition of this invention comprises essentially 85~98% wt, preferably 88~95% wt, of pentasil-type molecular sieve having a $SiO_2/Al_2O_3$ molar ratio of 15~60, 1~10% wt, preferably 2~8% wt, of phosphorus (based on $P_2O_5$), 0.3~5% wt, preferably 0.5~3% wt of an alkaline earth metal (based on oxide), and 0.3~5% wt, preferably 0.5~3% wt, of a transition metal (based on oxide).

According this invention, the said pentasil-type molecular sieve in said composition is ZSM-5, ZSM-8 or ZSM-11 structure type molecular sieve, in which the preferred molecular sieve is ZSM-5 structure type, with a silica to alumina molar ratio of 15~60, preferably 15~40, and lower silica to Alumina ratio is beneficial for yielding more ethylene.

The said alkaline earth metal in said composition of this invention is preferably selected from magnesium or calcium.

The said transition metal in said composition of this invention is a metal which has dehydrogenation function, selected from Group IB, IIB, VIB, VIIB or VIII of the periodic table, preferably selected from the group consisting of Cr, Mn, Fe, Co, Ni, Cu, Zn, and more preferably selected from Ni, Cu or Zn.

In the composition of this invention, the said phosphorus, alkaline earth metal and transition metal are introduced into said molecular sieve by impregnating or mixing molecular sieve with their compounds. Then the molecular sieve is dried and calcined to cause interaction. Thereby the phosphorus, alkaline earth metal and transition metal are solidly fixed onto the molecular sieve.

According this invention, the preparation method of said pentasil-type zeolite containing composition of the invention comprises firstly adding a pentasil-type molecular sieve to an aqueous solution which contains phosphorus-containing compound, alkaline earth compound and transition metal compound, mixing thoroughly and impregnating for above 0.5 hour, the obtained mixture contains (in dry basis) 85~98% wt, preferably 88~95% wt of pentasil-type zeolite, 1~10% wt, preferably 2~8% wt, of phosphorus (based on $P_2O_5$), and 0.3~5% wt, preferably 0.5~3% wt, of an alkaline earth metal (based on oxide), and 0.3~5% wt, preferably 0.5~3% wt, of a transition metal (based on oxide), the mixture is then dried, and calcined at 450 to 650° C. for 1~4 hours.

In the method of this invention, the said phosphorus containing compound may be phosphoric acid, hydrogen phosphate, dihydric phosphate or phosphate, in which phosphoric acid is preferable.

In the method of this invention, the said alkaline earth metal compound is preferably the compound of magnesium or calcium, which can be their nitrate, sulfate or chloride, preferably nitrate or chloride.

In the method of this invention, the said transition metal containing compound is the compound of a metal having dehydrogenation function and selected from Group IB, IIB, VIB, VIIB or VIII of the periodic table, the preferred metal compound is a compound selected from the compound of Cr, Mn, Fe, Co, Ni, Cu or Zn, the more preferred compound is selected from the compound of Ni, Cu or Zn, which can be their nitrate, sulfate or chloride, preferably their nitrate or chloride, most preferably their chloride.

In the method of this invention, the said mixture has a water to solid weight ratio of (1~3):1.

In the method of this invention, the said calcination can be proceeded in air or in steam.

In comparison with the method of prior art (stepwise impregnation and calcination in U.S. Pat. No. 4,137,195), the method of this invention only needs one-step-through impregnation and calcination, it does not need series of steps for impregnation and calcination. So this method has not only simplified the preparation process, but also reduced the energy consumption and preparation cost; moreover, the product obtained has adequate hydrothermal stability, and when used in catalytic pyrolysis cracking, its ethylene yield is higher than that of the method of prior art.

In the reports of earlier patents, the introduction of activation element such as alkaline earth metal or transition metal can enhance the shape selective property, but the reaction activity is decreased. This is because the amount of activation element introduced is restrained by the zeolite. In the course of research for this invention, it is found that the amount of activation element introduced is correlated with the silica to alumina ratio of the zeolite. That is, the lower is the silica to alumina ratio, the higher is the capacity of activation elements to be introduced. For molecular sieve having a lower silica to alumina ratio, when a larger amount of activation elements is introduced, it can still maintain high reaction activity. In view of the fact that a higher the amount of activation element is introduced, the stronger its shape selective property will be, hence, selecting a zeolite with lower silica to alumina ratio is beneficial for producing ethylene in catalytic pyrolysis cracking reaction. However, in the prior art, it is generally emphasized that higher silica to alumina ratio is of benefit to the reaction. This is a special feature of this invention.

In this invention, it is found that, after the activation element, such as alkaline earth metal, is introduced, the number of Bronsted acid sites of the zeolite can be reduced, while the Lewis acid sites is relatively increased. The increase of Lewis acid sites is beneficial for ethylene production.

The transition metals such as Ni, Co, Zn, Cu, Cr, Mn introduced into pentasil-type molecular sieve are generally used as an active component for hydrogenation or dehydrogenation or aromatization reactions. This is because these elements have stronger hydrogen transfer property. In the catalytic cracking reaction for producing ethylene, the introduction of these elements can enhance the hydrogen transfer ability of the molecular sieve but is not of benefit to increasing the selectivity to olefin products. In our research work, it is found that the hydrogen transfer capability of transition metal is apparently suppressed in the presence of phosphorus element, and the selectivity to olefin, especially to ethylene and propylene, are increased, because of its dehydrogenation activity. In this invention, therefore, on the basis of the introduction of phosphorus and alkaline earth elements into the pentasil-type zeolite, the transition metals such as Ni, Zn, Cu are further introduced for improving the ethylene yield. At the same time, the presence of phosphorus can enhance the hydrothermal stability of the molecular sieve. This is another distinct feature of this invention.

In conclusion, this invention has provided a molecular sieve containing composition, by which the lower carbon olefins especially ethylene and propylene produced by catalytic pyrolysis cracking reaction can be remarkably increased in comparison with the prior art. In addition, the said composition has good hydrothermal stability.

The ZSM-5 molecular sieve obtained by synthesis belongs to orthorhombic crystal system. By inorganic ammonium exchange, $NH_4ZSM$-5 can be prepared therefrom, and the HZSM-5 is obtained after calcination at 500~600° C. In these preparation processes, the structural symmetry of the molecular sieve is found fundamentally to be unchanged. Under severe high temperature hydrothermal treatment, change in the structure symmetry of the ZAM-5 molecular sieve will occur, in which, its critical feature is that the peak at $2\theta=24.4°$ in x-ray diffraction (XRD) pattern becomes widened or even split. This change in structural symmetry is coincidental with the decrease of reaction activity of the molecular sieve in cracking reaction. So, in the examples of this invention and the comparative examples, the hydrothermal stability of active centers can be judged by x-ray diffraction (XRD) pattern. At the same time, the activity is evaluated with pulse-micro-reaction using tetradecane ($nC_{14}$) as reactant.

In this invention, the molecular sieve materials used in the examples and comparative examples and their properties are listed as follows:

1. ZSM-5A, produced by the Zhoucun Catalyst Plant of the Qilu Petrochemical Co., synthesized with ethylamine as organic template, detemplated by calcination. Its silica to alumina molar ratio is 52.0, $Na_2O$ content is 0.10% wt after $NH_4^+$ exchange.

2. ZSM-5B, produced by the catalyst plant of Changling Refinery, with a silica to alumina molar ratio of 25.0 and a $Na_2O$ content of 0.10% wt after $NH_4^+$ exchange.

3. ZSM-5C, synthesized in our laboratory (example 1), with a silica to alumina ratio of 19.0, and a $Na_2O$ content of 0.05% wt after $NH_4^+$ exchange.

In this invention, the chemical compositions of molecular sieves used in the examples and comparative examples are determined by x-ray fluorescence (XRF) spectrometry.

Further explanation is made by the examples as follows in this invention.

EXAMPLE 1

This example illustrates the synthesis of the ZSM-5 zeolite having a lower silica to alumina ratio used in this invention.

24.6 g of sodium meta-aluminate was dissolved in 667 g of decationized water, then 71.7 g of $H_3PO_4$ (85 wt %) was added with stirring. After homogeneously stirring, the solution was added into 643 g of water glass ($SiO_2$ 28 wt %, $Na_2O$ 9.0 wt %) and stirred for 4 hours, then 19.5 g of ZSM-5 molecular sieve (produced by Zhoucun catalyst plant, $SiO_2/Al_2O_3$=52.0) was added as crystal seeds. After continuously stirring for 2 hours, the mixture was transferred to a stainless steel autoclave, crystallized under stirring at 175° C. for 15 hours and then cooled to room temperature. The crystallized product was then filtered out, washed and dried at 120° C., and the ZSM-5C sample was obtained. The relative crystallinity of the sample (compared to ZSM-5A) was 92% given by XRD analysis.

This sample was exchanged under a 1:1:20 weight ratio of molecular sieve to ammonium nitrate to decationized water at 90° C. for 2 hours, then filtered and water washed, the filter cake was exchanged again under the same conditions, and dried at 120° C. The ammonium-type ZSM-5C sample was obtained with a $Na_2O$ content of 0.05% wt.

Comparative Example 1

This comparative example illustrates the effect of ordinary HZSM-5 molecular sieves.

A moderate amount of $NH_4^+$ exchanged ZSM-5A molecular sieve was taken for calcination in ceramic vessel, then calcined in muffle furnace at 550° C. for 2 hours. The obtained sample was pelletized to 20~40 mesh particles. A moderate amount of the particle molecular sieve was fed into stainless steel tube reactor, then aged at 100% steam atmosphere for 4 hours at a temperature of 800° C. with decationized water at a space velocity of 8 $h^{-1}$. Under the same hydrothermal treatment conditions, the ammonium exchanged molecular sieve samples of ZSM-5B and 5C were calcined and high temperature hydrothermal treated. The obtained samples were designated respectively as DZSM-5A, DZSM-5B and DZSM-5C. X-ray diffraction analysis and tetradecane ($nC_{14}$) micro-pulse reactor evaluation were performed for the above three aged samples and the results are listed in table 1. The conditions of micro-pulse reactor evaluation were that the amount of molecular sieve loaded was 0.1 g, reaction temperature was 480° C. and $N_2$ flow rate was 30 ml/min, the pulse feeding of $nC_{14}$ was 0.5 micro-liter.

TABLE 1

| Zeolite | XRD 24.4° Peak | conversion of $nC_{14}$,% |
| --- | --- | --- |
| DZSM-5A | double peaks | 26.6 |
| DZSM-5B | double peaks | 33.1 |
| DZSM-5C | double peaks | 30.5 |

It can be observed that after high temperature steam treatment, the structure of ordinary HZSM-5 molecular sieves has changed, since the $2\theta=24.4°$ peaks have split into double peaks, and the conversion of $nC_{14}$ has been lowered remarkably at the same time.

Comparative Example 2

This comparative example illustrates the effects of the ZSM-5 modified by P and Mg elements of the prior art.

19 g ZSM-5B molecular sieve sample (dry basis) was put into an aqueous solution prepared by dissolving 1.9 g $(NH_4)_2HPO_4$ in 40 g decationized water. After stirring at room temperature for 12 hours, it was dried at 120° C. and calcined at 550° C. for 2 hours. The obtained sample was again mixed with another aqueous solution prepared by dissolving 1.51 g Mg(CH$_3$COO)$_2$.4H$_2$O in 40 g decationized water. After stirring at room temperature for 12 hours, it was then dried at 120° C. and calcined at 550° C. for 2 hours. This sample is denoted as D-2. XRF analysis showed that the contents of P$_2$O$_5$ and MgO were 5.0% wt and 1.4% wt respectively.

According to the method described in comparative example 1, the sample D-2 was pelletized, hydrothermally aged at 800° C. for 4 hours in 100% steam atmosphere. The results of XRD and nC$_{14}$ pulse-micro-reactor evaluation are listed in table 2.

Comparative Example 3

19 g ZSM-5A molecular sieve sample (dry basis) was added to an aqueous solution prepared by dissolving 1.9 g (NH$_4$)$_2$HPO$_4$ in 40 g decationized water, the mixture was stirred at room temperature for about 12 hours, then dried at 120° C., and calcined at 550° C. for 2 hours.

The obtained sample was further mixed with an aqueous solution prepared by dissolving 0.43 g ZnCl$_2$ in 40 g decationized water. The mixture was stirred at room temperature for 12 hours, then dried at 120° C. and calcined at 550° C. for 2 hours. The obtained molecular sieve is denoted as D-3. XRF analysis showed that the contents of P$_2$O$_5$ and ZnO were 5.0% wt and 1.3% wt respectively.

According to the method described in comparative example 1, the above sample D-3 is pelletized and hydrothermally aged at 800° C. for 4 hours in 100% steam atmosphere. The results of XRD and nC$_{14}$ micro-pulsereactor evaluation are listed in table 2.

EXAMPLE 2

19 g ZSM-5B molecular sieve sample (dry basis) was added into an aqueous solution prepared by mixing 1.62 g 85% wt H$_3$PO$_4$, 40 g decationized water, 1.48 g MgCl$_2$.6H$_2$O and 0.70 g Ni(NO$_3$)$_2$.6H$_2$O. The mixture is stirred at room temperature for 2 hours, then dried at 120° C., and calcined at 550° C. for 2 hours. The obtained molecular sieve is denoted as ZEP-11. According to XRF analysis, the content of P$_2$O$_5$, MgO and NiO were 4.9%, 1.4% and 0.86% wt respectively.

According to the method described in comparative example 1, the ZEP-11 sample was aged under high temperature hydrothermal condition. The results of XRD and nC$_{14}$ pulse-micro-reactor evaluation are given in table 2.

EXAMPLE 3

19 g ZSM-5B molecular sieve sample (dry basis) was added into an aqueous solution prepared by mixing 1.62 g 85% wt H$_3$PO$_4$, 40 g decationized water, 0.98 g MgCl$_2$.6H$_2$O and 2.09 g Ni(NO$_3$)$_2$.6H$_2$O. The mixture was stirred at room temperature for 2 hours, then dried at 120° C., and calcined at 550° C. for 2 hours. The obtained molecular sieve sample was denoted as ZEP-12. XRF analysis showed that the contents of P$_2$O$_5$, MgO and NiO were 4.9%, 0.91% and 2.6% by weight respectively.

According to the method described in comparative example 1, the obtained ZEP-12 sample was aged under high temperature hydrothermal condition. The results of XRD and nC$_{14}$ pulse-micro-reactor evaluation are listed in table 2.

EXAMPLE 4

19 g ZSM-5B molecular sieve sample (dry basis) was added in an aqueous solution prepared by dissolving 1.62 g 85% wt H$_3$PO$_4$, 1.48 g MgCl$_2$.6H$_2$O and 0.33 g ZnCl$_2$ in 40 g decationized water. The mixture was stirred at room temperature for 2 hours, then dried at 120° C., and calcined at 550° C. for 2 hours. The obtained molecular sieve was denoted as ZEP-13. XRF analysis showed that, the contents of P$_2$O$_5$, MgO and ZnO were 4.9%, 1.4% and 0.94% by weight respectively.

According to the method described in comparative example 1, the obtained ZEP-13 sample was aged under high temperature hydrothermal condition. The results of XRD and nC$_{14}$ pulse-micro-reaction evaluation are listed in table 2.

EXAMPLE 5

19 g ZSM-5C molecular sieve sample (dry basis) was added in an aqueous solution prepared by mixing 1.62 g 85% wt H$_3$PO$_4$, 40 g decationized water, 1.00 g MgCl$_2$.6H$_2$O and 0.65 g ZnCl$_2$. The mixture obtained was stirred at room temperature for 2 hours, then dried at 120° C., and calcined at 650° C. for 1 hour. The obtained molecular sieve was denoted as ZEP-14. XRF analysis showed that the contents of P$_2$O$_5$, MgO and ZnO were 4.9%, 0.94% and 1.9% by weight respectively.

According to the method described in comparative example 1, the obtained ZEP-14 sample was aged under high temperature hydrothermal condition. The results of XRD and nC$_{14}$ pulse-micro-reaction evaluation are listed in table 2.

EXAMPLE 6

19 g ZSM-5B molecular sieve sample (dry basis) was added into an aqueous solution prepared by mixing 1.62 g 85% wt H$_3$PO$_4$, 40 g decationized water, 1.48 g MgCl$_2$.6H$_2$O and 0.57 g Cu(NO$_3$)$_2$.3H$_2$O. The mixture was stirred at room temperature for 2 hours, then dried at 120° C., and calcined at 550° C. for 2 hours. The obtained molecular sieve was denoted as ZEP-15. XRF analysis showed that this sample contained P$_2$O$_5$ 4.9% wt, MgO 1.4% wt and CuO 0.91% wt.

According to the method described in comparative example 1, the ZEP-15 sample obtained was aged under high temperature hydrothermal condition. The results of XRD and nC$_{14}$ pulse-micro-reaction evaluation are listed in table 2.

EXAMPLE 7

19 g ZSM-5C molecular sieve sample (dry basis) was added into an aqueous solution prepared by mixing 1.62 g 85% wt H$_3$PO$_4$, 40 g decationized water, 0.53 g CaCl$_2$.2H$_2$O and 1.15 g Cu(NO$_3$)$_2$.3H$_2$O. The obtained mixture was stirred at room temperature for 2 hours, then dried at 120° C., and calcined at 550° C. for 2 hours. The molecular sieve obtained was denoted as ZEP-16. XRF analysis showed that the sample contained P$_2$O$_5$ 4.9%, CaO 1.0% and CuO 1.9% by weight.

According to the method described in comparative example 1, the ZEP-16 sample obtained was aged under high temperature hydrothermal condition. The results of XRD and nC$_{14}$ pulse-micro-reaction evaluation are listed in table 2.

TABLE 2

| Molecular sieves | Shape of XRD 24.4° peak | Conversion of $nC_{14}$ % |
|---|---|---|
| D-2 | Single peak | 98.0 |
| D-3 | Single peak | 95.5 |
| ZEP-11 | Single peak | 99.6 |
| ZEP-12 | Single peak | 98.6 |
| ZEP-13 | Single peak | 99.3 |
| ZEP-14 | Single peak | 97.5 |
| ZEP-15 | Single peak | 92.2 |
| ZEP-16 | Single peak | 90.5 |

It can be observed from table 2 that after introducing the transition metals such as Ni and Zn, the molecular sieves have maintained a single peak at 2θ=24.4° in XRD pattern and high conversion of $nC_{14}$.

EXAMPLE 8

Based on a weight ratio of molecular sieve: alumina sol (calculated in $Al_2O_3$): kaolin of 15:15:70 by weight (dry basis), five catalysts were prepared by ordinary spray drying method using D-2, D-3, ZEP-11, ZEP-13, ZEP-15 molecular sieve samples without being aged as active components. A commercial catalyst CHP-1 (containing 20 wt % HZSM-5 molecular sieve produced by Zhoucun Catalyst Plant of Qilu Petrochemical Co.) for producing lower carbon olefins was selected as comparative catalyst. The above six catalysts were aged at 800° C. with 100% steam atmosphere for 4 hours, and evaluated by micro-reactor with light diesel fuel fraction as feedstock and fluidized fixed bed reactor with VGO as feedstock.

The results of micro-reaction evaluation with light diesel fuel fraction as feedstock are listed in table 3. The evaluation conditions were at a reaction temperature of 520° C., a catalyst/oil ratio of 3.2, a weight hourly space velocity of 16 $h^{-1}$ and a catalyst fed amount of 5.0 g. The light oil bad a boiling range of 229~340° C.

The results of catalytic pyrolysis reaction on fluidized fixed bed reactor are listed in table 4. The evaluation conditions were as follows: reaction temperature at 700° C., catalyst to oil ratio 10, feeding hourly space velocity 10 $h^{-1}$, and water/oil weight ratio 80:20. The feedstock used was a VGO fraction having a boiling range of 346~546° C.

From table 3 and table 4, it can be observed that the ethylene yield is remarkably increased by the introduction of transition metal of Ni, Zn, or Cu into the molecular sieves.

TABLE 3

| Molecular sieves | HZSM-5 | D-2 | D-3 | ZEP-11 | ZEP-13 | ZEP-15 |
|---|---|---|---|---|---|---|
| Conversion, wt % | 44.0 | 62.38 | 61.01 | 63.92 | 64.05 | 63.21 |
| Cracking gas yield, wt% | 16.76 | 27.23 | 26.46 | 27.63 | 27.65 | 26.98 |
| Ethylene | 0.82 | 2.88 | 3.02 | 3.51 | 3.46 | 3.32 |
| Propylene | 6.50 | 7.57 | 7.32 | 7.34 | 7.61 | 7.92 |
| Butenes | 5.63 | 4.95 | 4.20 | 4.71 | 4.82 | 5.22 |

TABLE 4

| Molecular sieve | HZSM-5 | D-2 | D-3 | ZEP-11 | ZEP-13 | ZEP-15 |
|---|---|---|---|---|---|---|
| Conversion, wt % | 89.93 | 91.02 | 90.51 | 92.72 | 93.63 | 90.75 |
| Product distribution, wt % | | | | | | |
| Cracking gas yield, wt % | 62.75 | 69.70 | 70.50 | 70.18 | 71.30 | 69.80 |
| Ethylene | 17.25 | 20.77 | 20.32 | 23.20 | 23.95 | 20.98 |
| Propylene | 18.91 | 22.47 | 19.57 | 21.66 | 22.08 | 21.33 |
| Butenes | 12.11 | 10.69 | 11.39 | 8.37 | 7.68 | 9.35 |
| $C_2= + C_3= + C_4=$ | 48.27 | 53.13 | 51.28 | 53.23 | 53.71 | 51.66 |
| Gasoline ($C_5$ ~ 221° C.) | 24.81 | 15.22 | 13.16 | 14.33 | 14.96 | 14.21 |
| LCO (221 ~ 330° C.) | 6.51 | 5.33 | 5.77 | 4.18 | 3.79 | 5.38 |
| HCO (>330° C.) | 3.56 | 3.65 | 3.72 | 3.10 | 2.58 | 3.87 |
| Coke | 6.37 | 6.10 | 6.85 | 8.21 | 7.37 | 6.74 |

Claims of the invention:

1. A pentasil-type molecular sieve containing composition which can be applied in catalytic cracking reaction for producing more ethylene and propylene comprising 85~98% wt pentasil-type zeolite which has a $SiO_2/Al_2O_3$ molar ratio of 15~60, 1~10% wt phosphorus (based on $P_2O_5$), 0.3~5% wt alkaline earth metal (based on its oxide), and 0.3~5% wt transition metal (based on its oxide).

2. The molecular sieve composition according to claim 1, comprising 88~95% wt pentasil-type zeolite which has a $SiO_2/Al_2O_3$ molar ratio of 15~60, 2~8% wt phosphorus (based on $P_2O_5$), 0.5~3% wt alkaline-earth metal (based on its oxide, and 0.5~3% transition metal (based on its oxide).

3. The molecular sieve composition according to claim 1, wherein said pentasil-type zeolite is a molecular sieve having a structure type of ZSM-5, ZSM-8, or ZSM-11.

4. The molecular sieve composition according to claim 3, wherein said pentasil-type zeolite is a molecular sieve having a structure type of ZSM-5.

5. The molecular sieve composition according to claim 1, 3 or 4, wherein said pentasil-type zeolite has a $SiO_2$ to $Al_2O_3$ molar ratio of 15~40.

6. The molecular sieve composition according to claim 1, wherein said alkaline earth metal is magnesium or calcium.

7. The molecular sieve composition according to claim 1, wherein said transition metal is a metal selected from Group IB, IIB, VIB, VIIB or VIII of the periodic table.

8. The molecular sieve composition according to claim 7, wherein said transition metal is a metal selected from the group consisting of Cr, Mn, Fe, Co, Ni, Cu and Zn.

9. The molecular sieve composition according to claim 8, wherein said transition metal is a metal selected from Ni, Cu, or Zn.

10. A method for preparing said composition according to claim 1, comprising: a pentasil-type zeolite is firstly added to an aqueous solution which contains a phosphorus-containing compound, an alkaline earth metal compound and a transition metal compound, homogeneously mixed and impregnated for above 0.5 hour, the obtained mixture contains(in dry basis) 85~98% wt pentasil-type molecular sieves, 1~10% wt phosphorus (based on $P_2O_5$), 0.3~5% wt alkaline earth metal (based on oxide), and 0.3~5% wt transition metal (based on oxide); the mixture is then dried, and calcined at 450 to 650° C. for 1~4 hours.

11. The method according to claim 10, wherein said mixture contains (in dry basis) 88~95% wt pentasil-type molecular sieves, 2~8% wt phosphorus (based on $P_2O_5$), 0.5~3% wt alkaline earth metal (based on oxide), and 0.5~3% wt transition metal (based on oxide).

12. The method according to claim 10, wherein said pentasil-type molecular sieve is a ZSM-5, ZSM-8 or ZSM-11 type molecular sieve.

13. The method according to claim 12, wherein said pentasil-type molecular-sieve is ZSM-5 type molecular sieve.

14. The method according to claim 10, 12 or 13, wherein said pentasil-type molecular sieve has a silica to alumina molar ratio of 15~40.

15. The method according to claim 10, wherein said phosphorus-containing compound is phosphoric acid, hydrogen phosphate or phosphate.

16. The method according to claim 10 or 15, wherein said phosphorus-containing compound is phosphoric acid.

17. The method according to claim 10, wherein said alkaline earth metal compound is a compound of magnesium or calcium.

18. The method according to claim 10 or 17, wherein said alkaline earth metal compound is its nitrate or chloride.

19. The method according to claim 10, wherein said transition metal compound is a compound containing a metal selected from the Group IB, IIB, VIB, VIIB or VIII of the periodic table.

20. The method according to claim 19, wherein said transition metal is a metal selected from the group consisting of Cr, Mn, Fe, Co, Ni, Cu and Zn.

21. The method according to claim 20, wherein said transition metal is a metal selected from Ni, Cu, or Zn.

22. The method according to claim 10, 19, 20 or 21, wherein said transition metal compound is its nitrate or chloride.

23. The method according to claim 10, wherein the water to solid weight ratio of said mixture is (1~3):1.

* * * * *